(12) United States Patent
Hautson et al.

(10) Patent No.: US 9,778,016 B2
(45) Date of Patent: Oct. 3, 2017

(54) METHOD AND DEVICE FOR LOCATING A MAGNETIC OBJECT

(71) Applicant: Commissariat à l'énergie atomique et aux énergies alternatives, Paris (FR)

(72) Inventors: Tristan Hautson, Grenoble (FR); Saifeddine Aloui, Grenoble (FR); David Dominique, Claix (FR); Timothée Jobert, Grenoble (FR); Andréa Vassilev, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 471 days.

(21) Appl. No.: 14/389,056

(22) PCT Filed: Mar. 29, 2013

(86) PCT No.: PCT/EP2013/056814
§ 371 (c)(1),
(2) Date: Sep. 29, 2014

(87) PCT Pub. No.: WO2013/144342
PCT Pub. Date: Oct. 3, 2013

(65) Prior Publication Data
US 2015/0057969 A1 Feb. 26, 2015

(30) Foreign Application Priority Data

Mar. 29, 2012 (FR) ..................... 12 52881

(51) Int. Cl.
*G01B 7/004* (2006.01)
*G01V 3/08* (2006.01)
*G06F 3/046* (2006.01)

(52) U.S. Cl.
CPC ............. *G01B 7/004* (2013.01); *G01V 3/081* (2013.01); *G06F 3/046* (2013.01)

(58) Field of Classification Search
CPC ........ G01B 7/004; G06F 3/046; G01V 3/081; G01V 3/08
See application file for complete search history.

(56) References Cited

U.S. PATENT DOCUMENTS 6,263,230 B1 7/2001 Haynor et al.
6,269,324 B1 7/2001 Rakijas et al.
(Continued)

FOREIGN PATENT DOCUMENTS

CN 101361660 5/2008
JP H03-276002 12/1991
(Continued)

OTHER PUBLICATIONS

Hu et al., A Cubic 3-Axis Magnetic Sensor Array for Wirelessly Tracking Magnet Position and Orientation, May 2010, IEEE Sensors Journal, vol. 10, No. 5, pp. 903-913.*
(Continued)

*Primary Examiner* — Toan Le
(74) *Attorney, Agent, or Firm* — Occhiuti & Rohlicek LLP

(57) ABSTRACT

Locating a moving magnetic object includes determining its position or orientation from measurements from an array N tri-axial magnetometers (N>5) mechanically linked to one another with 0-DOF by repeatedly estimating its position relative to the array from measurements made either in a preceding iteration or from a sensor distinct from the array's magnetometers before making a new measurement using the array's magnetometers; computing the distance between each magnetometer and the object's estimated position; eliminating Ni magnetometers closest to this estimated position, where Ni<N; using the remaining magnetometers, making a new measurement of the field generated or modified by the object; and determining its new position or
(Continued)

orientation from the new measurements so as to obtain the object's new location.

13 Claims, 2 Drawing Sheets

(56) References Cited

U.S. PATENT DOCUMENTS

| | | |
|---|---|---|
| 6,675,123 B1 | 1/2004 | Edelstein |
| 2002/0171427 A1 | 11/2002 | Wiegert et al. |
| 2007/0167703 A1 | 7/2007 | Sherman et al. |

FOREIGN PATENT DOCUMENTS

| | | |
|---|---|---|
| JP | H07-311649 | 11/1995 |
| JP | 2003-280794 | 10/2003 |
| JP | 2010-266910 | 11/2010 |
| JP | 2010-266911 | 11/2010 |

OTHER PUBLICATIONS

Richard J. Kozick et al., "Algorithms for tracking with an array of magnetic sensors," *Sensor Array and Multichannel Signal Processing Workshop* SAM 2008, 5th IEEE , pp. 423-427(2008).

* cited by examiner

METHOD AND DEVICE FOR LOCATING A MAGNETIC OBJECT

RELATED APPLICATIONS

This application is a U.S. National Stage of international application number PCT/EP2013/056814 filed Mar. 29, 2013, which claims the benefit of the priority date of French Patent Application FR 1252881, filed Mar. 29, 2012, the contents of which are herein incorporated by reference.

FIELD OF INVENTION

The invention relates to a method and a device for locating a moving magnetic object. The invention relates also to a screen equipped with such a locating device.

BACKGROUND

The known methods for locating a moving magnetic object comprise determining the position or the orientation of the magnetic object from measurements of an array of tri-axial magnetometers, this array comprising N tri-axial magnetometers mechanically linked to one another with no degree of freedom to retain a known distance between each of these magnetometers, where N is an integer number greater than 5.

A tri-axial magnetometer is a magnetometer suitable for measuring the projection of the magnetic field on three non-colinear measurement axes. Such a magnetometer measures the direction of the magnetic field. Furthermore, generally, this magnetometer also measures the amplitude or the norm of the magnetic field.

For example, such a method is disclosed in the patent application CN10 136 1660A. The use of an array of magnetometers makes it possible to very accurately locate the magnetic object.

However, the simultaneous use of a large number of magnetometers implies that there are a large number of measurements to be processed simultaneously, which requires a significant computation power to locate the moving object. Furthermore, the use of an array of magnetometers implies significant consumption since each magnetometer of this array is powered simultaneously.

Prior art is also known from:
US2002/171427A1,
U.S. Pat. No. 6,263,230B1,
US2007/167703A1,
U.S. Pat. No. 6,675,123B1,
Richard J KOZICK et Al: "Algorithm for tracking with an array of magnetic sensors", Sensor array and multichannel signal processing workshop, 2008, SAM 2008, 5th IEEE, Piscataway, N.J., USA, 21 Jul. 2008, pages 423-427;
U.S. Pat. No. 6,269,324B1.

SUMMARY OF INVENTION

The invention aims to remedy at least one of these drawbacks without modifying, even by enhancing, the accuracy of the locating of the magnetic object. To this end, the invention proposes a method for locating a magnetic object.

In the method of the subject invention, some of the measurements of the magnetometers are not used to determine the position or the orientation of the magnetic object. Thus, the number of measurements to be processed is reduced, which makes it possible to limit the required computation power. Furthermore, the applicant has found that eliminating the measurements of the closest magnetometers does not modify, or even enhance, the accuracy of the location. Thus, this method makes it possible to limit the computation power while retaining the location accuracy.

The embodiments of this location method can comprise one or more of the features of the dependent claims.

These embodiments also present the following advantages:
eliminating the closest magnetometers by comparison to the threshold $S_b$ makes it possible to automatically adapt the number of measurements taken into account to locate the magnetic object without in any way compromising the accuracy of this location;
setting the threshold $S_b$ at twice the greatest dimension of the magnetic object makes it possible to increase the accuracy of the location by eliminating the measurements for which the approximation of the magnetic object by a magnetic dipole is insufficiently accurate;
using a constant number $N_i$ of closest magnetometers to be eliminated makes it possible to avoid the use of a threshold $S_b$;
eliminating the saturated magnetometers makes it possible to increase the accuracy of the location of the magnetic object;
eliminating the magnetometers furthest away makes it possible to speed up the location of the magnetic object without significantly modifying the accuracy of this location;
not powering the eliminated magnetometers or reducing the frequency with which measurements are made by the eliminated magnetometers makes it possible to reduce the electrical consumption of the array of magnetometers.

A device for locating a moving magnetic object conforming to claim 12 is also a subject of the invention.

The embodiments of this locating device can comprise the feature of claim 13.

BRIEF DESCRIPTION OF THE DRAWINGS

The invention will be better understood on reading the following description, given purely as a nonlimiting example and with reference to the drawings, in which.

In these figures, the same references are used to designate the same elements.

DETAILED DESCRIPTION

Hereinbelow in this description, the features and functions well known to those skilled in the art are not described in detail.

Figure 1:
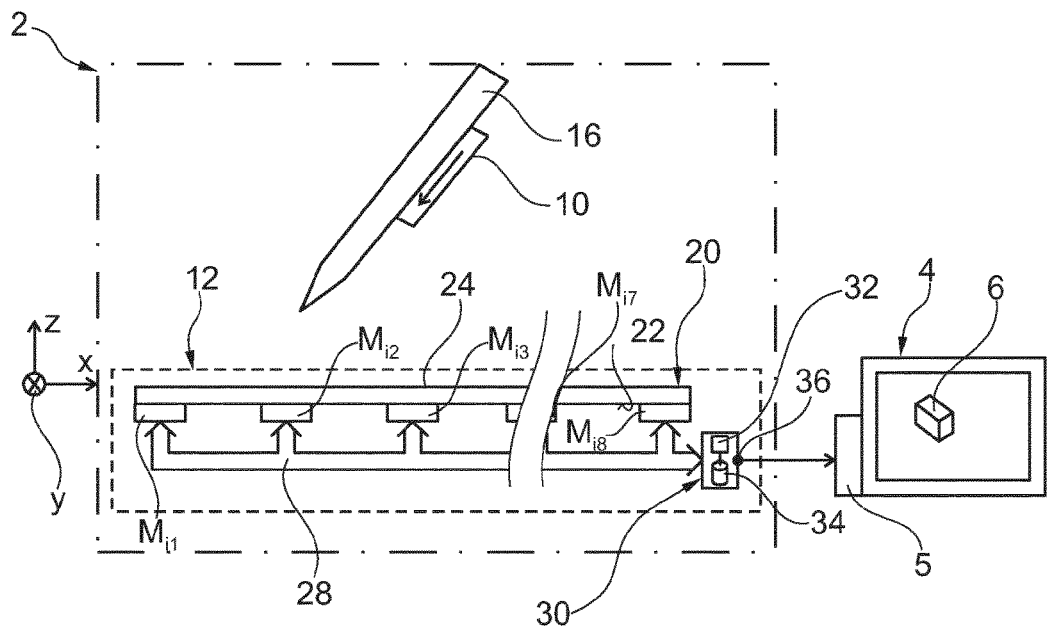
FIG. 1 is a schematic illustration of a human/machine interface making it possible to control an electronic apparatus.

FIG. 1 represents a human/machine interface 2 making it possible to control an electronic apparatus 4. Here, the apparatus 4 is a screen connected to a control unit 5 capable of controlling the display of an image on this screen 4.

Here, the operation of the human/machine interface 2 is illustrated in the case where the unit 5 controls the position and the orientation of a cursor 6 on the screen 4. For example, the cursor has a three-dimensional form. In FIG. 1, the cursor 6 is a parallelepiped. However, the interface 2 can be used in numerous other applications as is described at the end of this description.

The interface 2 comprises a magnetic object 10 and a device 12 for locating this object 10. The object 10 can be freely moved within an orthogonal reference frame XYZ fixed with no degree of freedom to the device 12. Here, the directions X and Y are horizontal and the direction Z is vertical.

For example, the object 10 is a permanent magnet exhibiting a non-zero magnetic moment even in the absence of any outside magnetic field. For example, the coercive magnetic field of this magnet is greater than 100 A·m$^{-1}$ or 500 A·m$^{-1}$. For example, it is made of ferro- or ferrimagnetic material.

The object 10 has an oblong form. In FIG. 1, the direction of the magnetic moment of the object 10 is represented by an arrow parallel to the longitudinal direction of this object. The greatest length of this object is denoted L hereinbelow. The power of the permanent magnet is typically greater than 0.01 A·m$^2$ or 0.1 A·m$^2$.

In this embodiment, the object 10 is fixed with no degree of freedom to a non-magnetic implement 16. Non-magnetic should be understood to mean an implement made of a material which does not exhibit any measurable magnetic property.

For example, the implement 16 is a pencil made of wood or plastic. The implement 16 can be located from the position of the object 10. The implement 16 also makes it possible to facilitate the manipulation of the object 10 if the latter is small. Typically, the combination of the object 10 and of the implement 16 can be freely moved directly by the hand of a human being within the reference frame XYZ. To this end, this combination weighs less than a kilo and, preferably, less than 200 g. The dimensions of this combination are small enough to be able to be grasped and moved by one hand of a user.

The device 12 makes it possible to locate the object 10 within the reference frame XYZ. Location should be understood here to mean the determination of the position x, y, z of the object 10 within the reference frame XYZ and also the determination of the orientation of the object 10 relative to the axes X, Y and Z of the reference frame XYZ. For example, the orientation of the object 10 is represented by the angles $\theta_x$, $\theta_y$ and $\theta_z$ of the magnetic moment of the object 10, respectively, relative to the axes X, Y and Z of the reference frame.

The device 12 comprises an array of N tri-axial magnetometers $M_{ij}$. In FIG. 1, the vertical wavy lines indicate that a part of the device 12 has not been represented.

Typically, N is greater than 5 and, preferably, greater than 16 or 32. Here, N is greater than or equal to 64.

In this embodiment, the magnetometers $M_{ij}$ are aligned in rows and in columns to form a matrix. Here, this matrix comprises eight rows and eight columns. The indices i and j identify, respectively, the row and the column of this matrix at the intersection of which the magnetometer $M_{ij}$ is located. In FIG. 1, only the magnetometers $M_{i1}$, $M_{i2}$, $M_{i3}$, $M_{i4}$ and $M_{i8}$ of a row i can be seen. The position of the magnetometers $M_{ij}$ relative to one another is described in more detail with reference to FIG. 2.

Each magnetometer $M_{ij}$ is fixed with no degree of freedom to the other magnetometers. To this end, the magnetometers $M_{ij}$ are fixed with no degree of freedom to a rear face 22 of a rigid plate 20. This rigid plate exhibits a front face 24 turned toward the object 10. The plate 20 is made of a rigid non-magnetic material. For example, the plate 20 is made of glass.

Each magnetometer $M_{ij}$ measures the direction and the intensity of the magnetic field generated by the object 10. For this, each magnetometer $M_{ij}$ measures the norm of the orthogonal projection of the magnetic field generated by the object 10 at the level of this magnetometer $M_{ij}$ on three measurement axes of this magnetometer. Here, these three measurements axes are mutually orthogonal. For example, the measurement axes of each of the magnetometers $M_{ij}$ are, respectively, parallel to the axes X, Y and Z of the reference frame. The sensitivity of the magnetometer $M_{ij}$ is, for example, $4*10^{-7}$ T.

Each magnetometer $M_{ij}$ is connected via an information transmission bus 28 to a processing unit 30.

The processing unit 30 is capable of determining the position and the orientation of the object 10 in the reference frame XYZ from the measurements of the magnetometers $M_{ij}$. To this end, the unit 30 comprises a programmable electronic computer 32 suitable for executing instructions stored on an information storage medium. The unit 30 therefore also comprises a memory 34 containing the instructions needed for the execution by the computer 32 of the method of FIG. 3. In particular, the unit 30 implements a mathematical model associating each measurement of a magnetometer $M_{ij}$ with the position and the orientation of the object 10 in the reference frame XYZ. This model is implemented in the form of an extended Kalman filter. This model is typically constructed from the physical equations of electromagnetism. To construct this model, the object 10 is approximated by a magnetic dipole. This approximation introduces only very few errors if the distance between the object 10 and the magnetometer $M_{ij}$ is greater than 2 L and, preferably, greater than 3 L, where L is the greatest dimension of the object 10. Typically, L is less than 20 cm and, preferably, less than 10 or 5 cm.

The unit 30 is also capable of reproducing the position and the measured orientation of the object 10 on an interface 36.

The control unit 5 is connected to the unit 30 via this interface 36.

Figure 2:
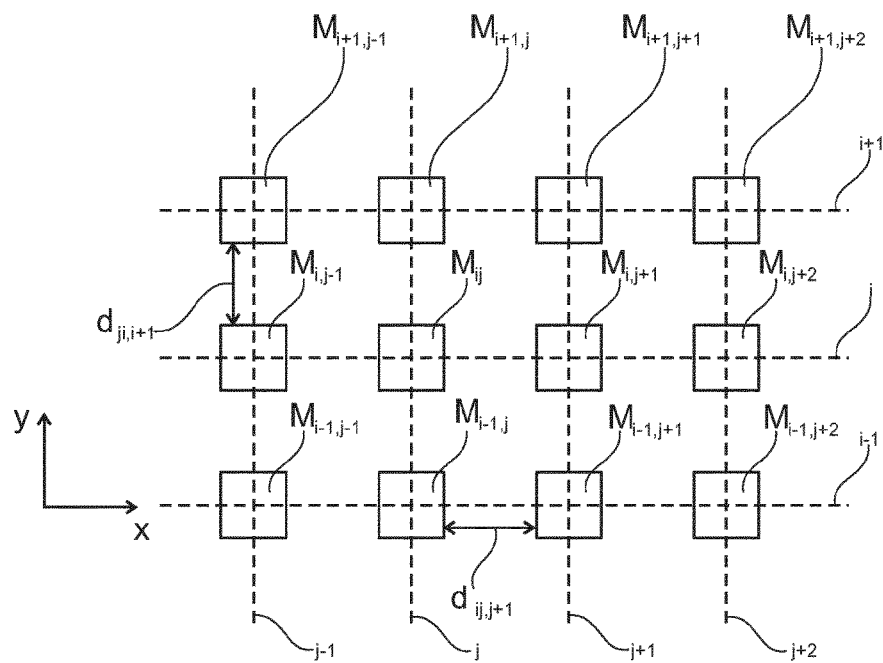
FIG. 2 is a partial plan view illustration of an array of magnetometers implemented in the human/machine interface of FIG. 1.

FIG. 2 represents some of the magnetometers $M_{ij}$ of the device 12. These magnetometers $M_{ij}$ are aligned in rows i parallel to the direction X. These magnetometers are also aligned in columns j parallel to the direction Y to form a matrix. The rows i and the columns j are arranged in ascending index number order.

The center of the magnetometer $M_{ij}$ is located at the intersection of the row i and of the column j. The center of the magnetometer corresponds to the point where the magnetic field is measured by this magnetometer. Here, the indices i and j lie within the interval [1; 8].

The centers of two immediately consecutive magnetometers $M_{ij}$ and $M_{ij+1}$ along a row i are separated by a known distance $d_{i,j,j+1}$. Similarly, the center of two immediately consecutive magnetometers $M_{ij}$ and $M_{i+1,j}$ along one and the same column j are separated by a known distance $d_{j,i,i+1}$.

In the particular case described here, whatever the row i, the distance $d_{i,j,j+1}$ is the same. This distance is therefore denoted $d_j$. Similarly, whatever the column j, the distance $d_{j,i,i+1}$ between two magnetometers is the same. This distance is therefore denoted $d_i$.

Here, the distances $d_i$ and $d_j$ are both equal to d.

Typically, the distance d is between 1 and 4 cm when:
the power of the permanent magnet is 0.5 A·m$^2$,
the sensitivity of the magnetometers is 4*10$^{-7}$ T, and
the number of magnetometers $M_{ij}$ is 64.

Figure 3:
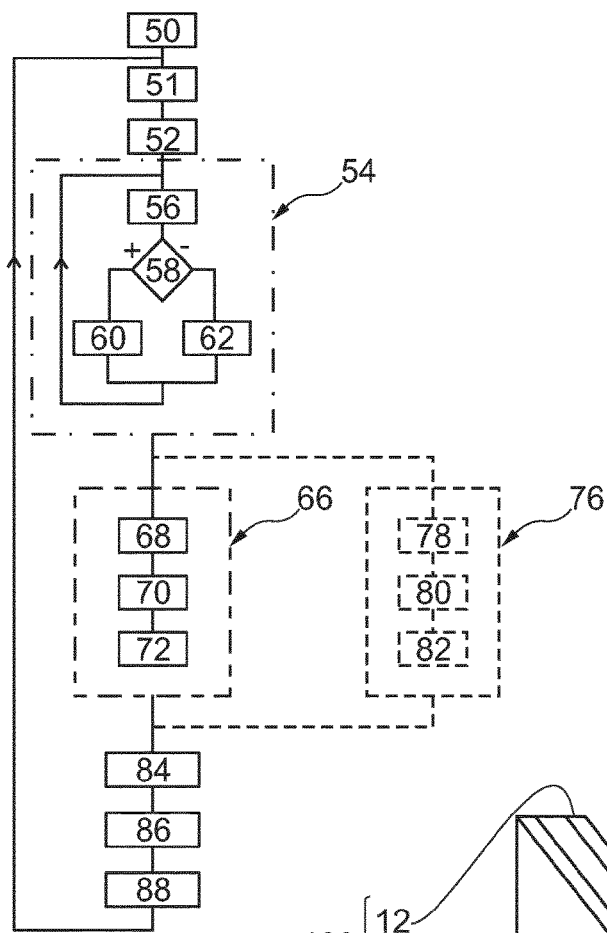
FIG. 3 is a flow diagram of a method for locating a moving magnetic object using the human/machine interface of FIG. 1.

The operation of the interface 2 will now be described with reference to the method of FIG. 3.

Initially, in a step 50, the extended Kalman filter is initialized by assuming that the object 10 is at the center of the array of magnetometers and by taking any fixed orientation for this object 10. For example, initially, the object 10 is considered to be horizontal.

In a step 51, the magnetometers saturated by the magnetic field of the object 10 are eliminated. A saturated magnetometer is a magnetometer for which the measurement no longer varies as this magnetometer is brought closer to the object 10. When a magnetometer is saturated, it delivers a known characteristic measurement signal different from those likely to be delivered when it is not saturated. Consequently, in the step 51, the computer 32 identifies the saturated magnetometers from the measurement signal delivered by each of them. The magnetometers identified as "saturated" are marked as being eliminated. For example, to this end, an identifier of this magnetometer is added to a list of eliminated magnetometers. In this description, a magnetometer identified as being eliminated is said to be "eliminated".

In a step 52, the position of the object 10 is estimated. This consists in finding values approximating as closely as possible to the real position of the object 10. Thus, each time the object 10 moves, the estimation of its new position varies to remain close to the real position. Here, this estimation consists in taking the previously determined position.

Then, in a step 54, the magnetometers $M_{ij}$ closest to the estimated position are identified.

In this embodiment, in the step 54, the magnetometer $M_{ij}$ is considered to be part of the magnetometers closest to the estimated position if the distance $e_{ij}$ which separates it from the estimated position is less than a predetermined threshold $S_b$. The value of the threshold $S_b$ is greater than or equal to 2 L and, preferably, greater than or equal to 3 L. Furthermore, the value of this threshold is chosen to be small enough for all of the magnetometers $M_{ij}$ never to be contained in a sphere of radii $S_b$ centered on the object 10, whatever the position of the object 10 relative to the device 12. For example, preferably, the value of the threshold $S_b$ is chosen to be less than half the distance between the two magnetometers $M_{ij}$ furthest apart from one another in the array. For example, here, the value of the threshold $S_b$ is chosen to be equal to 3 L.

In an operation 56, for each magnetometer $M_{ij}$, the distance $e_{ij}$ between this magnetometer and the estimated position is computed.

Then, in an operation 58, the computed distance $e_{ij}$ is compared to the threshold $S_b$. If the distance $e_{ij}$ is less than the threshold $S_b$, then, in an operation 60, this magnetometer $S_{ij}$ is identified as being part of the magnetometers closest to the estimated position. This magnetometer is then eliminated.

If the distance $e_{ij}$ is greater than the threshold $S_b$, the magnetometer $M_{ij}$ is not identified and nor is it eliminated.

The operations 56 to 62 are reiterated for each magnetometer $M_{ij}$.

At the end of the step 54, all the magnetometers for which the distance $e_{ij}$ is less than the threshold $S_b$ have been eliminated.

Then, in a step 66, the computer 32 identifies the magnetometers $M_{ij}$ which are furthest away from the estimated position of the object 10. The magnetometers furthest away are the magnetometers, chosen only from the magnetometers which have not already previously been eliminated, which do not belong to the group of the $N_p$ magnetometers closest to the estimated position, where $N_p$ is a predetermined integer strictly less than N. Preferably, $N_p$ is greater than 10 or 20.

This step 66 therefore consists in selecting only the magnetometers closest to the estimated position out of those which have not already been eliminated. For this, in an operation 68, the magnetometers $M_{ij}$ not yet eliminated are ranked in ascending or descending order as a function of their distance $e_{ij}$. In the operation 68, the distances $e_{ij}$ computed for the different magnetometers are compared to one another.

Then, in an operation 70, the computer selects the $N_p$ magnetometers associated with the smallest distances $e_{ij}$. By doing this, the computer selects only the $N_p$ magnetometers closest to the estimated position out of those which have not been eliminated in the step 54.

In an operation 72, the magnetometers not selected in the operation 70 are eliminated.

Optionally, in parallel with or in place of the step 70, in a step 76, the magnetometers $M_{ij}$ which do not belong to the group of the $N_n$ magnetometers measuring the magnetic field of greater norm are eliminated, where $N_n$ is an integer greater than 10 or 20 and strictly less than N.

For this, in an operation 78, the magnetometers $M_{ij}$ not yet eliminated are ranked in ascending or descending order of norm of the magnetic field measured by these magnetometers.

Then, in an operation 80, the computer 32 selects the $N_n$ first magnetometers in this list of magnetometers ranked in descending order of norm of the measured magnetic field. Consequently, by doing this, the computer 32 selects the $N_n$ magnetometers not yet eliminated and measuring the greatest signal.

In an operation 82, the magnetometers not selected in the operation 80 are eliminated.

Then, in a step 84, the magnetic field of the object 10 is measured using only the magnetometers not eliminated in the preceding steps. Preferably, in the step 84, the eliminated magnetometers are not powered so as to save energy.

In a step 86, the computer 32 determines the position and the orientation of the object 10 by using only the measurements of the non-eliminated magnetometers. For example, it eliminates from the extended Kalman filter the equations containing measurements originating from eliminated magnetometers. Then, it implements this Kalman filter to find the new position and orientation of the object 10. At the end of the step 86, the computer 32 reproduces, on the interface 36, the position and the orientation determined for the object 10. If the object 10 has moved, the position and the orientation determined at the end of the step 86 are more accurate than those estimated in the step 52.

In a step 88, the unit 5 controls the display of the cursor 6 on the screen 4 as a function of the position and of the orientation determined in the step 86. At the end of the step 88, the method returns to the step 51.

The limiting of the number of measurements used in the step 86 makes it possible to limit the computation power needed to locate the object 10. This limiting of the computation power can then be exploited, for example, to increase the accuracy of the location by processing more measurements within the same time period or to increase the computation speed and therefore more rapidly locate the object 10. Furthermore, this limiting of the number of measurements does not cause the accuracy of the location to be reduced, since only the potentially errored measurements, that is to say those of the magnetometers closest to the estimated position, or the measurements corresponding to the weakest signals are eliminated.

Figure 4:
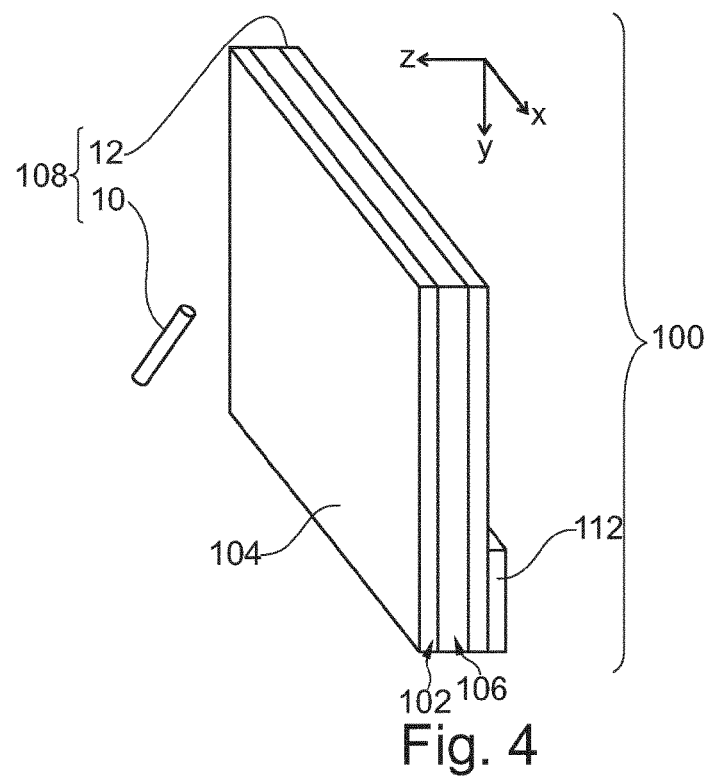
FIG. 4 is a schematic and perspective illustration of a screen incorporating a human/machine interface similar to that of FIG. 1.

FIG. 4 represents a screen 100 such as a television screen. This screen 100 comprises a face plate 102 made of material that is transparent to visible light. For example, the face plate 102 is made of glass. This face plate has a front face 104 turned toward the viewer and a rear face. Here, the front face is at right angles to the direction Z which is directed toward the viewer. Hereinafter in this description, the front and the rear of the screen 100 are defined relative to this direction Z.

The screen 100 also comprises a photon generation layer 106 to form each pixel on the face plate 102. This layer 106 is placed immediately behind the face plate 102. Different technologies are possible for producing this layer 106. Preferably, the technology retained consists of a layer without any metallic grid. Typically, the layer 106 is produced from organic light-emitting diodes, better known by the acronym OLED.

Finally, the screen 100 comprises a human/machine interface 108. This interface is identical to the interface 2 except that the magnetic object 10 is here not attached to any implement. The object 10 is placed on the side of the front face 104 when using this interface 108.

For its part, the location device 12 is placed behind the layer 106. The rows i and the columns j of the array of magnetometers extend parallel to the face 104. Preferably, the length of the diagonal between the magnetometers furthest apart in the array is equal to the diagonal of the front face 104 to within plus or minus 15% or 5%.

A control unit 112 is connected to the interface 36 of the device 12. This unit 112 is suitable for controlling the layer 106 to modify the display as a function of the position and/or of the orientation acquired by the human/machine interface 108. For example, the unit 112 controls a change of television channel being watched, a rewind or a fast forward or a zoom of the image as a function of the position and of the orientation acquired by the interface 108. Typically, the unit 112 is capable of performing the conventional commands applied to a screen but here, these commands are triggered in response to a movement of the object 10.

It will be noted that, in the case described here, the area of interaction with the screen extends beyond, in the directions X and Y, the front face 104. In practice, the position of the object 10 is measurable even if said object is placed to the left or to the right of the screen in the directions X or Y.

Numerous other embodiments are possible. For example, the electronic apparatus can be a computer screen, a cell phone or an electronic tablet. The electronic apparatus controlled from the human/machine interface 12 or 108 can also be different from a screen. For example, the electronic apparatus can be an apparatus for acquiring a handwritten text or drawing. In this case, the object 10 is fixed with no degree of freedom to a pencil. The control unit 5 comprises a module for locating the point of the pencil relative to the plate 20 and for storing each position of the point when the latter is in contact with the plate 20. In these conditions, the unit 5 makes it possible to create a file containing the trace left by the point of the pencil on the top face 24.

The human/machine interface can be used to control screen functions other than the simple position and orientation of a cursor. For example, the human/machine interface can be used to trigger an enlargement of an image when the magnetic object is moved closer to the plate 20 and, conversely, a shrinking of the image when the magnetic object is moved away from the plate 20.

The magnetic object is not necessarily a permanent magnet. As a variant, the magnetic object is simply capable of modifying the lines of a magnetic field into which it is dipped. For example, the magnetic object acquires a nonzero magnetic moment in the presence of an ambient magnetic field such as the Earth's magnetic field. For example, the magnetic object is a part or a bar made of paramagnetic or diamagnetic material. The magnetic object can also be a part or a bar made of soft ferromagnetic material, that is to say one whose coercive magnetic field is strictly less than $100$ $A \cdot m^{-1}$ or made of ferrimagnetic material.

If the surface area of the array of magnetometers is sufficiently extensive, the apparatus 2 can simultaneously comprise a plurality of magnetic objects 10. In this case, the method described above is applied, in parallel, for each of these magnetic objects. The list of the eliminated magnetometers is then specific to each magnetic object.

The tablet 20 can have widely varying forms. For example, the tablet 20 is a table on which a user can write with a chalk or a felt pen.

The processing unit 30 can be physically incorporated inside the controlled apparatus instead of being incorporated inside the human/machine interface.

As a variant, the control unit selects the algorithm used in the step 86 to determine the position and/or the orientation of the object 10 as a function of the position estimated in the step 52. For example, if the object 10 is very close to the array of magnetometers and its magnetic moment is vertical, the model linking the measurements of the magnetometers to the position and to the orientation of the object 10 is modified. In this case, the modification consists, for example, in setting the value of the magnetic moment of the object 10 on the axis Z.

Other variants of the algorithm for determining the position and/or the orientation of the object 10 are possible. For example, the measurements of the magnetometers are first of all used to construct a magnetic imprint of the object 10. The constructed imprint is then compared to a database of predetermined magnetic imprints of known objects. This database associates with each known object additional information such as, for example, the value of its magnetic moment. If the constructed imprint corresponds to one of those of the database, the additional information associated with this known object is then used to enhance or simplify the location of this object in the step 86.

The approximation used to construct the Kalman filter can also be a quaternary or higher approximation, that is to say that the electromagnetism equations are approximated to a higher order than that corresponding to the dipolar approximation.

The magnetometers of the array of magnetometers are not necessarily arranged in columns and rows. They can also be arranged according to other patterns. For example, the magnetometers are arranged on each vertex of each triangular or hexagonal mesh of a grid of a drawing.

The arrangement of the magnetometers relative to one another can also be random or irregular. Thus, the distance between two immediately consecutive magnetometers in the array is not necessarily the same for all the pairs of two immediately consecutive magnetometers. For example, the density of magnetometers in a given area of the array can be greater than elsewhere. Increasing the density in a given area can make it possible to increase the accuracy of the measurement in that area. It is also possible to provide areas of greater density on the periphery of the array to limit the edge effects. For example, the array of magnetometers can comprise a central area without any magnetometer. In this case, the magnetometers are only distributed over the periphery of this central area and form a strip of magnetometers which surrounds and delimits the central area. Typically, the width of this strip is strictly less than the width of the central area measured in the same direction.

This non-uniform distribution of the magnetometers can be applied to create a variant of the screen 100. In this variant, the magnetometers of the location device 12 are not entirely placed behind the photon generation layer 106. For example, the magnetometers $M_{ij}$ are mainly arranged around the layer 106. In this case, these magnetometers $M_{ij}$ define a strip of magnetometers which surrounds an area without any magnetometer or with a lower density of magnetometers. This strip of magnetometers can be fixed directly to the face plate 102.

As a variant, the array of magnetometers extends in only one direction. The magnetometers are then arranged one after the other along one and the same row.

Conversely, the array of magnetometers can also extend in three non-collinear directions of the space. In these conditions, the magnetometers are distributed within a three-dimensional volume.

The number N of magnetometers can also be greater than or equal to 64 or 90.

All the magnetometers of the array of magnetometers are not necessarily identical to one another. As a variant, the magnetometers do not all have the same sensitivity. In this case, the less accurate magnetometers are, for example, arranged in proximity to the center of the array while the most accurate magnetometers are arranged on the periphery of this array. Such an embodiment presents the advantage of placing the magnetometers that are most difficult to saturate, and therefore the least sensitive, in positions likely to be closest to the magnetic object. This also makes it possible to extend the area of interaction.

As a variant, different methods for eliminating the magnetometers furthest away from the estimated position can be combined. For example, the steps 66 and 76 are both implemented to retain only the magnetometers that are both close and which measure the greatest signal. In another variant, elimination of the magnetometers furthest away from the estimated position or measuring the weakest norm of the magnetic field can also be omitted.

The elimination of the magnetometers closest to the estimated position can also be omitted when it is not needed. For example, it is not necessary when the distance which separates the magnetometers from the object for which the position has to be measured is necessarily greater, for example by mechanical construction, than the distance for which the dipolar approximation is acceptable. In this case, only the elimination of the magnetometers furthest away is implemented.

The elimination of the saturated magnetometers can be performed at other times. For example, it can be performed after the step 54, 66 or 76. The elimination of the saturated magnetometers can also be omitted.

As a variant, rather than not powering the eliminated magnetometers to save energy, it is possible to set the frequency of acquisition $f_a$ of a new measurement by these eliminated magnetometers to a value $Vf_e$ strictly less than the value $Vf_{ne}$ of the frequency of acquisition of a new measurement by the non-eliminated magnetometers. For example, the value $Vf_e$ is chosen to be two or ten times less than the value $Vf_{ne}$. In practice, typically, each magnetometer comprises an analog-digital converter which converts the analog physical quantity representative of the measured magnetic field into a digital value. The frequency of acquisition $f_a$ corresponds to the sampling frequency of this analog-digital converter. Consequently, by limiting the frequency of acquisition $f_a$, the sampling frequency is limited, which also limits the electrical consumption of the magnetometer. For the non-eliminated magnetometers, the value $Vf_{ne}$ is chosen to be equal to or less than the value $Vf_{exe}$ of the frequency of execution of the step 86. Thus, if the magnetic object moves, the new measurements of the non-eliminated magnetometers take this movement into account. For the eliminated magnetometers, since their measurements are not taken into account in the step 86, it is not necessary for the value $Vf_e$ to be less than the value $Vf_{exe}$. This is exploited in this variant to limit the electrical consumption of the eliminated magnetometers without stopping them from being powered. For example, the value $Vf_e$ is set to be two or ten times greater than the value $Vf_{exe}$.

Numerous different methods can be used to determine the position and the orientation of the magnetic object. For example, the method described in U.S. Pat. No. 6,269,324 can be used. These methods do not necessarily use a Kalman filter. For example, the methods described in US2002/171427A1 or U.S. Pat. No. 6,263,230B1 are possible. In another variant, only the position or only the orientation of the magnetic object is determined.

The various processing operations described here can be performed in post-processing mode, that is to say that, initially, all the measured data are stored in a memory, then the elimination of the measurements of certain magnetometers is implemented subsequently when the stored data are processed.

In another embodiment, the estimation of the position of the magnetic object in the step 52 is obtained from a measurement of another sensor distinct from those belonging to the array of magnetometers. This other sensor is, preferably, insensitive to the magnetic field. For example, it is a camera associated with a shape recognition module for estimating the position of the object relative to the array of magnetometers.

The step 51 of elimination of the saturated magnetometers can also be implemented without the other magnetometer elimination steps.

The screen 100 described here can be implemented with methods for locating the magnetic object other than that described with reference to FIG. 3. In particular, the location method used does not necessarily implement the identification and the elimination of the magnetometers closest to the magnetic object.

The invention claimed is:

1. A method for locating a moving magnetic object, said method comprising determining the position or the orientation of the magnetic object from measurements from an array of N tri-axial magnetometers, the array comprising tri-axial magnetometers that are mechanically linked to one another with no degree of freedom so that a known distance is retained between each of said magnetometers, wherein N is an integer that is greater than five, and wherein the method comprises reiterating the steps of estimating the position of the magnetic object relative to the array of magnetometers from measurements of the magnetometers made in a preceding iteration or from a measurement of a sensor distinct from the magnetometers of the array of magnetometers so that the estimate is obtained before making a new measurement using the magnetometers of the array; computing the distance between each magnetometer and the estimated position of the magnetic object, thereby generating computed distances, using the computed distances to eliminate the $N_i$ magnetometers closest to the estimated position, wherein $N_i$ is a positive integer less than N using each non-eliminated magnetometer, making a new measurement of the magnetic field generated or modified by the magnetic object and determining a new position or a new orientation of the magnetic object from the new measurements without taking into account new measurements made by those magnetometers that have been eliminated.

2. The method of claim 1, wherein using the computed distances to eliminate the $N_i$ closest magnetometers comprises, for each magnetometer: comparing the computed distance to a predetermined threshold $S_b$, eliminating the magnetometer if the computed distance is less than the predetermined threshold $S_b$, and, if not, excluding the magnetometer from the $N_i$ magnetometers eliminated following the comparison.

3. The method of claim 2, wherein determining the new position or the new orientation of the magnetic object comprises approximating the magnetic object with a magnetic dipole, and wherein the predetermined threshold $S_b$ is at least twice the greatest dimension of the magnetic object and less than the greatest distance separating the two magnetometers furthest away from one another in the array.

4. The method as claimed in claim 1, wherein the number $N_i$ is a constant that is predetermined before using the computed distances to eliminate the $N_i$ magnetometers closest to the estimated position.

5. The method as claimed in claim 1, wherein using the computed distances to eliminate the $N_i$ magnetometers closest to the estimated position comprises eliminating the $N_i$ magnetometers that are closest to the estimated position, and identifying the magnetometers that do not belong to a group of $N_p$ magnetometers that were not eliminated and that are closest to the estimated position of the magnetic object, wherein $N_p$ is a positive predetermined integer such that $N_i+N_p$ is less than N, and eliminating the duly identified magnetometers.

6. The method of claim 1, wherein using the computed distances to eliminate the $N_i$ magnetometers closest to the estimated position comprises eliminating the $N_i$ magnetometers closest to the estimated position identifying the magnetometers that do not belong to a group of $N_n$ magnetometers that were not eliminated, measuring the magnetic fields of greater norm, where $N_n$ is a positive predetermined integer number such that $N_i+N_n$ is less than N, and eliminating the duly identified magnetometers.

7. The method of claim 1, further comprising identifying saturated magnetometers from a characteristic signal delivered only by the saturated magnetometers and eliminating the identified saturated magnetometers.

8. The method of claim 1, wherein, in the measurement step, the eliminated magnetometers are not powered.

9. The method of claim 1, further comprising setting the frequency of acquisition of a new measurement by the eliminated magnetometers to a value that is less than the value of the frequency of acquisition of a new measurement by the non-eliminated magnetometers.

10. The method of claim 1, wherein determining a new position or a new orientation of the magnetic object comprises selecting, from said magnetometers, only those magnetometers that have not been eliminated and determining based only on measurements from those magnetometers that have not been eliminated.

11. The method of claim 1, further comprising eliminating the $N_e$ magnetometers furthest away from the estimated position, where $N_i+N_e$ is a positive integer number less than N.

12. An apparatus comprising a device for locating a moving magnetic object, wherein the device comprises an array of magnetometers, wherein the array comprises N tri-axial magnetometers that are mechanically linked to one another with no degree of freedom thereby retaining a known distance between each of these magnetometers, wherein N is an integer greater than or equal to five, an electronic processing unit suitable for determining the position or the orientation of the magnetic object from measurements made using the magnetometers of the array, wherein the electronic processing unit is programmed to reiterate the steps recited in claim 1.

13. The apparatus of claim 12, wherein the number of magnetometers is greater than or equal to 16 and wherein the magnetometers are coplanar in a plane and distributed in the plane so as to form several columns of magnetometers that are parallel to one another.

\* \* \* \* \*